May 26, 1964    C. H. LATIMER-NEEDHAM    3,134,452
GROUND EFFECT MACHINES HAVING FLEXIBLE SKIRTS
Filed Nov. 30, 1961

INVENTOR
CECIL HUGH LATIMER-NEEDHAM,
BY Lawson and Taylor
ATTORNEYS 3,134,452
GROUND EFFECT MACHINES HAVING
FLEXIBLE SKIRTS
Cecil H. Latimer-Needham, Wonersh, near Guildford, England, assignor to Westland Aircraft Limited, Yeovil, England, a corporation
Filed Nov. 30, 1961, Ser. No. 155,919
8 Claims. (Cl. 180—7)

This invention relates to the use of a cushion of air interposed between a vehicle and the ground or water in order to provide a lifting force and a supporting medium which allows horizontal motion of the vehicle with small frictional losses, these vehicles being generally known in the art as ground effect machines or vehicles.

Ideally, a vehicle supported on two masses of air, one static relative to the surface and the other static relative to the vehicle, would have extremely low frictional resistance to horizontal movement since the shearing forces between the two air masses would be negligible compared to conventional supporting means. Of course such an idealized arrangement is not possible in a normal ground effect vehicle since there is in fact only one mass of air involved, and it is constantly escaping to the surrounding atmosphere. Thus it is necessary to constantly replenish the supporting mass of air in a manner which entails injecting additional air at a relatively high velocity.

Further, it is necessary to confine the supporting mass of air beneath the vehicle platform. The confinement of the air mass becomes more difficult as the height at which the vehicle operates increases since the area through which the supporting air can escape increases with the height of the vehicle. However, the ability of the vehicle to negotiate uneven terrain is largely dependent upon the height at which it operates.

It is an object of the instant invention to provide an improved ground effect vehicle by improving the means for creating and maintaining the air cushion which supports the vehicle.

It is a further object of this invention to provide a ground effect vehicle which can function at increased operating heights.

It is yet a further object of this invention to provide a ground effect machine wherein a series of inwardly directed peripheral nozzles or jets cooperate with a flexible skirt member extending around the base of the machine to create and maintain an improved air cushion under the machine, so as to increase the operating height of the machine, and so as to generally substantially improve the operation of the machine and widen its fields of operation.

It is still a further object of this invention to provide a ground effect machine having a peripheral skirt of flexible material extending downwardly from the base so as to form at least the upper part of the outside boundary of the air cushion under the base, the skirt tapering inwardly toward its lower edge so that the cushion pressure will tend to maintain the skirt in its extended position, and a series of peripheral nozzles arranged so as to have their exit orifices directed inwardly and terminating adjacent the inner wall of the skirt, so as to create an improved supporting air cushion and to minimize the effects of obstacles in the path of the machine.

A further object of this invention is to provide an arrangement by which the vehicle is rendered generally more stable over rough terrain.

According to the present invention the underside of the vehicle may be in the form of a platform or disc containing a series of jets or nozzles spaced downwardly around the periphery through which air under pressure is expelled to provide the air cushion.

The air supply is provided by a suitable air compressor or pump, driven by an internal combustion or other engine, or a turbine.

In order to restrict the loss of air, the jets or nozzles are preferably positioned as near as practicable to the outer edge of the platform and are so set that the air jets are directed away from the outer edge, i.e. inwards towards the central portion of the platform or with some inward component and thus tend to neutralize airflow velocity in the outward direction. The velocity of the air jets is carefully selected to provide this restraining action without releasing excessive uncontrolled energy that may have deleterious effects.

A lip or skirt is provided around the periphery of the platform to form the upper part of the outside boundary of the air cushion. For operation over level ground or water this skirt may be shallow, but in order that the vehicle may operate over rough ground or water, without excessive loss of air, the platform must be lifted to a sufficient height to clear obstructions, and for this purpose a deeper skirt of any suitable flexible material, e.g. rubberized fabric, is employed.

The flexible skirt is made so that it will give way to and pass over obstacles and remain in its extended condition. To prevent collapse upward, the area of opening at the base is less than the cross-sectional area some distance above, and this may be achieved by a tapering towards the base, the taper forming part or the whole of the skirt, or the skirt may be concave inwards, in cross-section, over the lower portion or over the length of the skirt. By this means there is a component of force, due to the internal pressure, acting downward to keep the skirt extended.

The skirt may be strengthened around or near the bottom lip by means of a grommet or other suitable tension member, and the lip may be further supported by means of diametral tension members spanning the base opening, or by tension members running from the lip to any convenient points under the platform. All or any of such tension members may be of elastic material to permit intermittent extension when under load.

When a deep skirt is employed it may be preferable to locate the air nozzles at or near the skirt base in order to provide a more effective barrier to the escape of air. Connection to the source of supply of pressurized air may be by flexible tubing.

In order to overcome instability due to deformation of the air cushion skirt, say by passing over rough ground, it is proposed, in one preferred form of construction, to fit the vehicle with a plurality of air cushions, for example in the form of a tripod.

In operation the vehicle is lifted clear of the ground or water by supplying air at some pressure greater than that of the ambient atmosphere to the chamber formed below the platform, there being a small clearance between the skirt lip and the ground. The pressure bears relationship to the total weight supported and the area of the base or platform. Lateral movement may be obtained by the application of a lateral force produced by any convenient means, such as an air propeller or jet, or by permitting the cushion air to escape from the rear of the vehicle, i.e. from the side away from the desired direction of motion in the form of a propulsion jet.

The intake of the air pump is directed forward to take advantage of the ram air effect caused by motion of the vehicle.

In order that the invention may be more clearly understood and readily carried into practice the invention will now be described by way of example with reference to the accompanying drawing.

Figure 1:
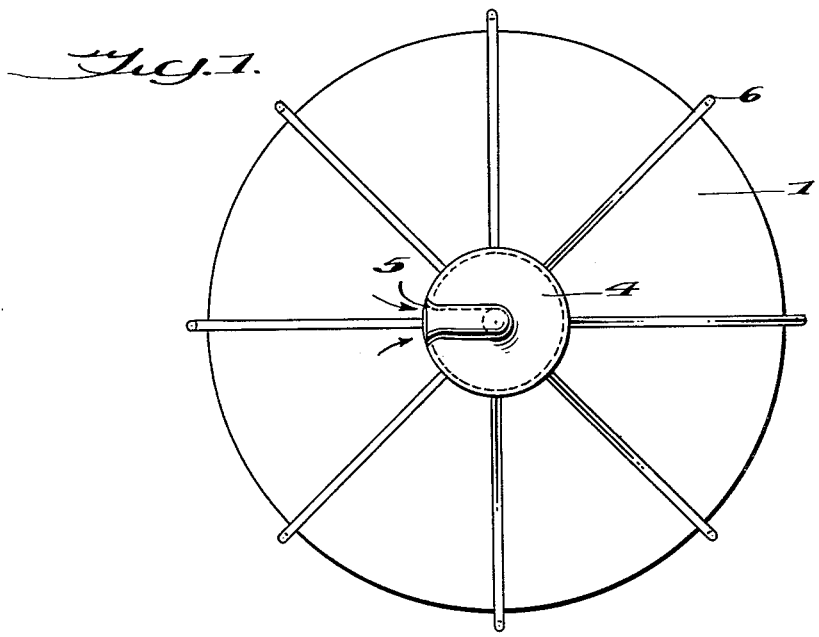
FIG. 1 is a top view of an example of the invention.
Figure 2:
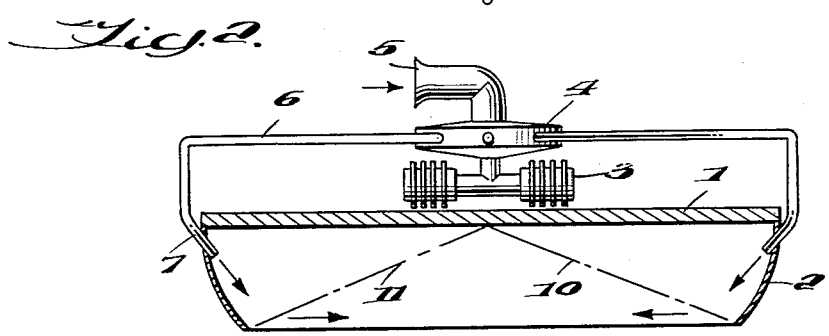
FIG. 2 is a side view of an example of the invention with the platform and skirt in section.
Figure 3:
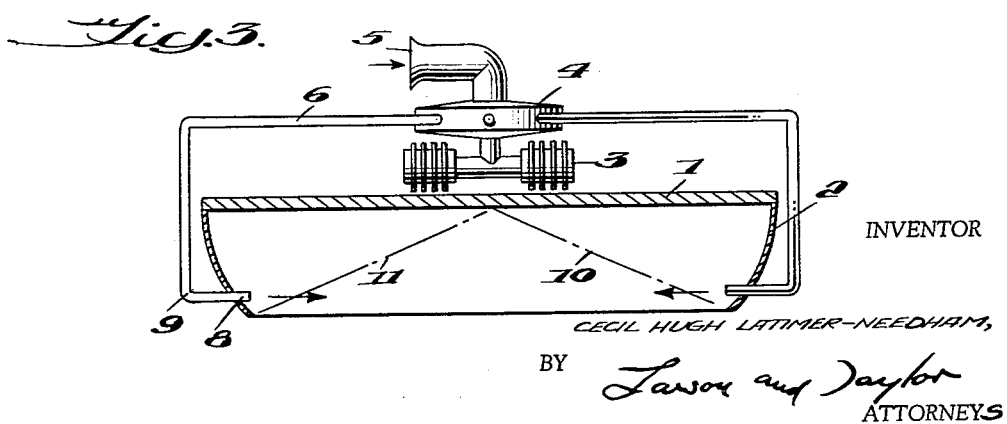
FIG. 3 is a side view of an example of the invention with the platform and skirt in section and further illustrating a modification of the nozzle arrangement.

The vehicle comprises a platform 1, forming the base and fitted with a skirt 2. An engine 3 is mounted on the platform and drives an air pump 4, having a forward facing intake 5, for supplying pressurized air via suitable piping or ducts 6 to the nozzles 7 which are set to direct the air with an inwards component, as indicated by arrows. When a relatively deep skirt is fitted the nozzles may be located near the lower extremity 8 and may be supplied with air via flexible extensions 9, as shown, for example, in FIG. 3. Tension bracing to lend support to the skirt is shown at 10 and 11.

What I claim is:

1. A vehicle for lifting and transporting loads supported above and clear of the surface by means of at least one air cushion, comprising: a base member, a skirt of substantially fluid tight flexible material extending downwardly from the periphery of said base and being attached thereto in a substantially fluid tight relationship to form at least the upper part of the outside boundary of an air cushion under said base, the free peripheral edge of said skirt being flaccid and defining a cross sectional area less than the cross sectional area of the base member, the skirt tapering inwardly from the point of attachment to the base to the free edge thereof, a series of peripheral nozzles having exit orifices spaced downwardly from the base and terminating adjacent the inner wall of the skirt and being inwardly directed to form and maintain the air cushion within the skirt, the internal pressure of the air cushion having a downward component acting against the inwardly tapered skirt to maintain the skirt in the extended position thereof, the flaccid free peripheral edge of the skirt permitting the skirt to fold locally to pass over an obstacle without substantial loss of pressure in the air cushion.

2. A vehicle as set forth in claim 1 wherein said nozzle orifices are carried by said flexible skirt so as to flex with said skirt.

3. A vehicle as set forth in claim 1 wherein said skirt is formed from a rubberized fabric.

4. A vehicle as set forth in claim 1 further comprising tension members connected to the depending portion of said flexible skirt and to said base member for providing at least partial support to said skirt.

5. A vehicle as set forth in claim 4 wherein said tension members are elastic.

6. A vehicle as set forth in claim 1 further comprising tension members interconnecting spaced points on the depending portion of said skirt for providing at least partial support to said skirt.

7. A vehicle for lifting and transporting loads supported above and clear of the surface by means of at least one air cushion, comprising a base member, a skirt of substantially fluid tight flexible material extending downwardly from the periphery of said base and being attached thereto in a substantially fluid tight relationship to form at least the upper part of the outside boundary of an air cushion under said base, the free peripheral edge of said skirt being flaccid and defining a cross sectional area less than the cross sectional area of the base member, the skirt tapering inwardly from the point of attachment to the base to the free edge thereof, a series of peripheral nozzles having exit orifices spaced downwardly from the base and terminating adjacent the inner wall of the skirt substantially at the lower edge of the skirt and being inwardly directed to form and maintain the air cushion within the skirt, and flexible duct means for conducting pressurized air downwardly to said nozzle orifices, the internal pressure of the air cushion having a downward component acting against the inwardly tapered skirt to maintain the skirt in the extended position thereof, the flaccid free peripheral edge of the skirt permitting the skirt to fold locally to pass over an obstacle without substantial loss of air pressure in the air cushion.

8. A vehicle as set forth in claim 7 wherein said nozzle orifices are carried by said flexible skirt so as to flex with said skirt.

References Cited in the file of this patent

UNITED STATES PATENTS

| 1,123,589 | Porter | Jan. 5, 1915 |
| 2,322,790 | Cristadoro | June 29, 1943 |
| 3,052,483 | Petersen | Sept. 4, 1962 |
| 3,055,446 | Vaughen | Sept. 25, 1962 |
| 3,078,940 | Rolle | Feb. 26, 1963 |
| 3,117,643 | Cockerell | Jan. 14, 1964 |

FOREIGN PATENTS

| 137,405 | Russia | Apr. 10, 1961 |
| 219,133 | Australia | Jan. 8, 1959 |
| 229,914 | Australia | Oct. 22, 1959 |
| 860,781 | Great Britain | Feb. 8, 1961 |
| 935,825 | Great Britain | Sept. 4, 1963 |
| 1,238,499 | France | July 4, 1960 |
| 1,251,967 | France | Dec. 12, 1960 |

OTHER REFERENCES

Publication: David Taylor Model Basin Report 1463, December 1960.

Publication: "Aviation Week," July 6, 1959, pages 115, 116.